May 31, 1955 — H. Y. MAGEOCH — 2,709,724
CURRENT COLLECTOR SHOE
Filed June 4, 1951 — 2 Sheets-Sheet 2
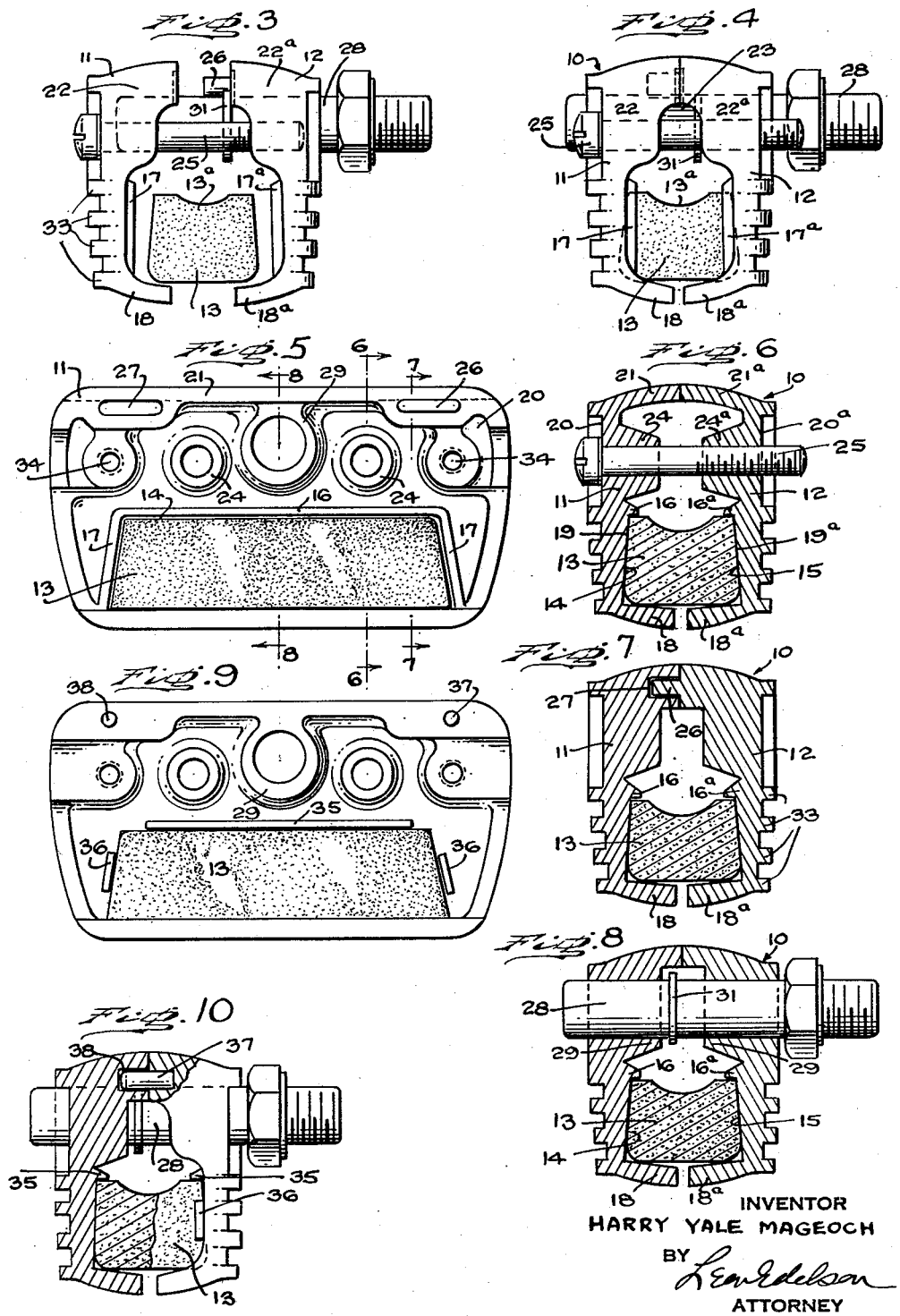
INVENTOR
HARRY YALE MAGEOCH
BY Leon Edelson
ATTORNEY United States Patent Office 2,709,724
Patented May 31, 1955

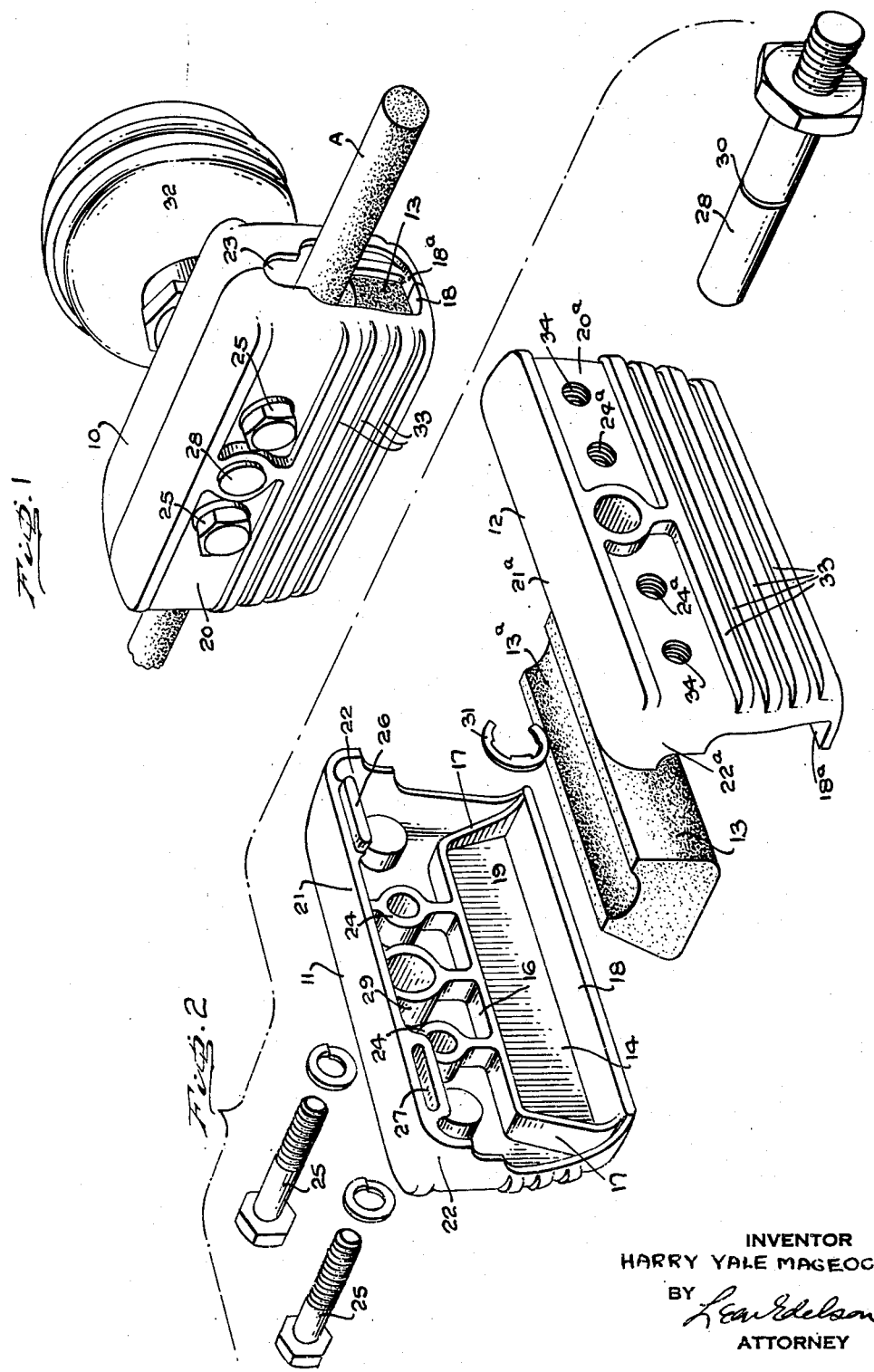

2,709,724

CURRENT COLLECTOR SHOE

Harry Yale Mageoch, Havertown, Pa., assignor to Electric Service Manufacturing Company, Philadelphia, Pa., a corporation of Pennsylvania Application June 4, 1951, Serial No. 229,835

8 Claims. (Cl. 191—59.1)

This invention relates to current collecting devices of the type adapted for picking up current from a suspended trolley wire for utilization in electrically operated vehicles or moving machinery.

Among the principal objects of the present invention are to provide a current collector which is designed to removably receive an electrically conductive shoe contact member having a relatively long wire-contacting area resulting in a noiseless, non-arcing, non-welding, self-cleaning and self-lubricating contact with the trolley wire; to provide a current collector which operates conjointly with the inserted shoe to provide an enclosed run-way for the trolley wire which retains the latter against operative displacement from the collector and which shelters the carbon contact from dirt, dust and other materials having a deleterious effect upon the contact; and to provide a current collector made up of separable parts which may be partially separated without complete disassembly thereof sufficiently to facilitate quick and easy replacement as desired of the trolley contact insert.

A still further object of the present invention is to provide a current collector in the form of a readily separable housing for a replaceable contact shoe for the trolley wire, and which housing is mounted for pivotal movement about a central horizontally extending axis, as well as for lateral movement along said axis, to properly and effectively maintain the insert in longitudinal alinement with its contacting trolley wire, thereby insuring maximum contact with the wire and corresponding low voltage drop for a given current.

Still another and important object of the invention is to provide a current collector formed of separable parts which are adapted to be rigidly and securely interlocked to immovably clamp therebetween the wire-contacting removable insert, the separable parts of the collector, when assembled in clamping relation with respect to the insert, providing an enclosed, continuous run-way, equal to the length of the collector, for the trolley wire which is engaged by the insert and providing, further, means for transferring heat generated in the insert to the atmosphere.

Other objects and advantages of the invention will appear more fully hereinafter, it being understood that the present invention consists substantially in the combination, construction, location and relative arrangement of parts, all as will appear in the following specification, as shown in the accompanying drawings and as finally pointed out in the appended claims.

In the accompanying drawings:

Figure 1 is a perspective view showing the current collector of the present invention supported in position to pick-up current from a trolley wire extending through the collector;

Figure 2 is a perspective view showing the several parts of the collector in separated relation;

Figure 3 is an end elevational view of the collector of Figure 1 with the parts thereof partially separated for insertion of the removable contact member;

Figure 4 is an end elevational view showing the collector completely assembled with the contact member operatively clamped in position;

Figure 5 is an elevational view of the inner face of one of the side members of the collector;

Figure 6 is a transverse sectional view of the completely assembled collector as taken along the line 6—6 of Figure 5;

Figure 7 is a transverse sectional view of the collector as taken along the line 7—7 of Figure 5;

Figure 8 is a transverse sectional view as taken along the line 8—8 of Figure 5;

Figure 9 is a view similar to Figure 5 but showing a modified construction of the current collector; and Figure 10 is an end elevational view of the modified construction of collector showing certain parts thereof in transverse section.

Referring now more particularly to the drawings, it will be observed that the current collecting device of the present invention, designated generally by the reference numeral 10, consists essentially of a pair of side members 11 and 12 which are complementally shaped and adapted for interlocking engagement to provide a holder for a wire-contacting insert 13 in the form of a solid block of carbon or other suitable electrical conducting material. While this insert may be formed of bronze or of a ferrous metal, it is preferable to form it of carbon, graphite or other non-metallic electrically conductive material in view of the fact that such material is known to have such a burnishing action upon the trolley wire as to provide the latter with a smooth, polished surface resulting in longer life for the wire, as well as for the insert.

Inasmuch as the carbon or graphite inserts are especially subject to cracking due to shocks imparted thereto as they traverse the trolley wire, the holder for the insert as constructed in accordance with the present invention is designed to so clampingly receive the full body of the insert as to reduce the likelihood of its being damaged in use and to prevent such untoward separation of the insert along the line of any fracture thereof which might occur while the same is in use as would result in further breakage and ultimate complete disintegration of the insert.

In order to effect this latter objective, the members 11 and 12 of the holder for the insert 13 are respectively provided upon their internal faces with opposed complementally shaped elongated recesses 14 and 15 for accommodating opposite side portions of the insert. These recesses are each of generally trapezoidal form in longitudinal section, the recess 14 of the member 11 being bounded along its top by a horizontally extending flange 16, along its opposite ends by oppositely inclined flanges 17—17, and along its bottom by the inwardly turned bottom flange 18, all of which flanges are formed as integral parts of the member 11. The recess 15 in the opposite member is correspondingly bounded along its top, end and bottom by corresponding flanges respectively designated 16a, 17a—17a and 18a. The base walls 19 and 19a of the opposed recesses are respectively oppositely inclined downwardly and outwardly, as best shown in Figure 6, to conjointly provide in the assembled holder for the insert an internal seat of generally trapezoidal form in transverse section.

Thee insert 13, which may be extruded or otherwise formed into shape, is in the form of a solid block of generally trapezoidal shape in both longitudinal and transverse section, so that when its opposite longitudinally extending sides are respectively accommodated within the opposed recesses 14 and 15 of the holder members 11 and 12 and the latter are secured together, by the means presently to be described, the insert is clamped secured and immovably within the holder against displacement therefrom in any direction. The upper surface of the insert 13 is longitudinally grooved, as at 13ª, to receive a trolley wire, designated A in Figure 1, the wire groove being centered between opposite side edges of the insert.

The opposed members 11 and 12 of the holder for the insert are respectively provided with upwardly extending complementally shaped wall portions 20 and 20ª formed along their upper edges with inturned flanges 21 and 21ª the free edges of which are adapted to meet in the vertical median plane of the holder to provide for the holder a closed top which is spaced vertically above the longitudinally grooved top surface of the insert 13. In addition, the members 11 and 12 are each provided at their opposite ends with end closure flanges or portions 22—22 and 22ª—22ª which cooperate, when the members 11 and 12 are clamped together, to enclose the upper end portions of the insert holder, these end enclosures being centrally notched, as at 23, to preclude any possibility of the trolley wire becoming bound between the insert 13 and contiguous parts of its holder as the unit slides along the wire to collect current therefrom Formed upon the internal face of the holder member 11 are a pair of longitudinally spaced apertured bosses 24—24 which are respectively adapted for registry with a correspondingly spaced pair of tapped bosses 24ª—24ª formed upon the internal face of the member 12, each registering pair of the bosses being adapted to receive a securing bolt 25 for drawing the members 11 and 12 into clamping engagement with respect to the insert 13 disposed therebetween. It is important to note in this connection that the bosses 24—24 and 24ª—24ª are of insufficient length to abut one another when the members 11 and 12 are bolted together and that the general design and arrangement of these members is such that they abut only along the meeting line of their top flanges 21—21ª. Thus, when the members 11 and 12 are bolted together, they swing relatively to one another along said top meeting line, in the nature of a clam shell, to securely lock the insert 13 between their recessed bottom portions. Due to the relatively inclined side walls of the insert operating in conjunction with the correspondingly inclined inner surfaces of the recesses 14 and 15, upon bolting of the members 11 and 12 together, the insert is cammed downwardly into intimate engagement with the opposed bottom flanges of the members 11 and 12, thereby insuring a positive retention of the insert in fixed position within the holder with maximum space for the trolley wire immediately above the grooved upper surface of the insert.

In order to insure proper registry of the members 11 and 12 for easy and effective assembly thereof, the top flanges 21 and 21ª thereof are each provided with a freely projecting flat lug 26 adjacent one end thereof and a complementally shaped socket 27 at the opposite end thereof, the lug of one member being located for registry with and insertion into the socket of the opposite member. The lug 26 is received within its socket 27 with sufficient play to permit the desired relative swinging action of the members 11 and 12 about their top meeting line aforesaid, and if desired the meeting edges of said members at the opposite ends thereof may be longitudinally undercut, as shown by the dotted lines in Figures 3, 4 and 5, to increase the effectiveness of the hinged connection between the meeting edges of their top-most flanges.

For supporting the current collector unit upon the vehicle in proper position to run along the suspended trolley wire from which current is supplied to the vehicle, the unit is pivotally supported upon a central shaft 28 which extends transversely through suitably bored registering bosses 29—29 respectively formed on the members 11 and 12. These bosses are each located centrally between opposite ends of each member and well above the grooved top surface of the insert 13 so that the pivot shaft 28 does not unduly restrict the space above the insert for free accommodation of the trolley wire. The portion of the shaft 28 which extends between the inner ends of the registering bosses 29—29 is circumferentially grooved, as at 30, to receive a split retaining ring 31 which serves to permit restricted movement of the current collector unit in either direction axially of its supporting shaft 28, one end of which latter projects freely beyond the outer wall of the unit to receive thereon a strain insulator 32 of any conventional type and design for mounting the unit upon the traveling vehicle is insulated relation with respect thereto.

Thus, it will be apparent that as the collector unit slides along the trolley wire A it is free to rock about the shaft 28 as a pivot to maintain the insert 13 in contact with the wire along the full length of its wire-receiving groove 13ª, at the same time that it is free to shift axially of the pivot shaft in either direction to maintain the grooved insert in longitudinal alinement with the wire and to prevent binding engagement of the wire against the internal surface of one or other of the metal side members 11 and 12 of the unit. This capability of the unit to shift axially of its pivot shaft 28, i. e., toward and away from the frame of the vehicle upon which the unit is mounted, is of special advantage where two or more of the collector units are mounted in tandem relation upon the frame of a single vehicle for sliding contact with a single trolley wire. Due to the relative flexibility of the wire and the weaving of the vehicle as it travels along its track, the dispostion of the wire relatively to the vehicle is constantly undergoing change and so requires corresponding positional adjustment of the current collectors, which in the present case is effected automatically as the latter slide along the wire to individually maintain the insert of each collector unit in full-length, non-binding contact with the trolley wire.

The external surfaces of the side members 11 and 12 are each provided with a series of heat-radiating fins 33 which serve to radiate to atmosphere the heat generated in the insert 13. In this connection it is important to observe that the insert, when properly clamped between the finned members 11 and 12, presents relatively large surface areas in intimate contact therewith, thereby increasing the efficiency of heat transfer from the insert to atmosphere.

The current collector unit may be connected electrically to the vehicle which draws current from the trolley wire by any suitable means, preferably by means of a conductor having a terminal lug (not shown) adapted for quick-detachable securement to a terminal screw which is threaded into either one of a pair of tapped holes 34—34 suitably provided in each of the members 11 and 12.

Should it be necessary to replace the insert 13, it is merely necessary to loosen the bolts 25—25 to permit partial separation of the members 11 and 12 to an extent sufficient to permit withdrawal of the insert and its replacement by a new one, following which the bolts 25—25 are retightened. Thus, the insert may be replaced without requiring complete removal of the current collector unit from the trolley wire.

Figures 9 and 10 show a modified construction of the unit wherein the perimetrally continuous flanges above described for engaging the top and opposite ends of the insert are replaced by separated flanges or lugs 35 and 36—36 formed upon the inner face of each of the side members 11ª and 12ª. Also, instead of employing the flattened lug 26 for registry with the correspondingly shaped socket 27 as in the previously described construction of the current collector, in the modified construction of Figures 9 and 10 a simple pin 37 is employed in each clamping member for registry with an axially alined hole 38 formed in the opposite member. In all other material respects the construction of the unit as shown in Figures 9 and 10 is similar to that of Figures 1 to 8, inclusive.

It will be understood, of course, that the present invention is susceptible of various other changes and modifications which may be made from time to time without departing from the general principles or real spirit thereof, and it is accordingly intended to claim the same broadly, as well as specifically, as indicated by the appended claims.

What is claimed as new and useful is:

1. In a current collector of the character described, a trolley-wire contacting shoe and a metallic holder for said shoe including a pair of complementally formed members adapted to be clamped about opposite longitudinal sides of said shoe, said members having substantially parallel side wall portions extending upwardly above the wire-contacting upper surface of said shoe to form a walled passage for the wire extending through the full length of the holder, means providing a separable hinged connection between the upper ends of said members along a line disposed in the longitudinally extending vertical median plane of the holder, and means below said hinged connection and above said wire passage for drawing said members together in clamping relation about said shoe.

2. In a current collector as defined in claim 1 wherein said members are respectively provided in their lower portions with longitudinally extending opposed recesses for respectively accommodating opopsite sides of said contacting shoe to fixedly locate the latter between the clamped members of its holder.

3. In a current collector as defined in claim 1 wherein the opposed members of the holder are respectively provided at the upper ends thereof with inturned flanges having free edges which are adapted to abut one another to form the aforesaid separable hinged connection.

4. In a current collector as defined in claim 1 wherein the opposed members of the holder are respectively provided at the upper ends thereof with inturned flanges having free edges which are adapted to abut one another to form the aforesaid separable hinged connection, said flanges constituting conjointly a top enclosure for the wire passage through the holder.

5. In a current collector as defined in claim 1 wherein said holder is provided above said wire passage with transversely extending means for supporting the same for pivotal movement about an axis extending transversely of the holder.

6. In a current collector as defined in claim 1 wherein said holder is provided above said wire passage with transversely extending means for supporting the same for lateral shifting movement along an axis extending transversely of the holder.

7. In a current collector as defined in claim 1 wherein said holder is provided above said wire passage with transversely extending means for supporting the same both for pivotal movement about and for lateral shifting movement along a fixed axis extending transversely of the holder.

8. A current collector of the character described comprising a wire-contacting element and a metallic holder for said element, said holder including a pair of complementally formed side members adapted to be secured in clamping relation about said wire-contacting element to form an enclosure therefor having open ends, said side members having opposed internal recesses for respectively accommodating opposite sides of said element to locate the same immovably between said members, each of said recesses having a downwardly and outwardly inclined inner wall surface bounded at the top and opposite ends thereof by inturned flanges each of a width substantially less than one-half the overall width of said wire-contacting element, said members having substantially parallel side wall portions extending above the said element to provide an open-ended walled passage for the wire extending through the full length of the holder, and means extending transversely of and above said wire passage for securing said members together.

References Cited in the file of this patent

UNITED STATES PATENTS

| 623,678 | Lebcher | Apr. 25, 1899 |
| 626,296 | Pennington | June 6, 1899 |
| 1,972,418 | Greer | Sept. 4, 1934 |
| 2,185,270 | Ryan | Jan. 2, 1940 |
| 2,412,052 | Lewis | Dec. 3, 1946 |
| 2,416,830 | Heuberger | Mar. 4, 1947 |
| 2,495,750 | Milazzo | Jan. 31, 1950 |
| 2,508,531 | Mosley | May 23, 1950 |

FOREIGN PATENTS

| 714,360 | Germany | Nov. 27, 1941 |

OTHER REFERENCES

Riley, abstract of application serial number 753,011 published July 12, 1949, 624 O. G. 638.